US007478793B2

(12) United States Patent
Graffin

(10) Patent No.: US 7,478,793 B2
(45) Date of Patent: Jan. 20, 2009

(54) FILLER SPOUT WITH OPENING SERVO-CONTROLLED BY A PILOT VALVE

(75) Inventor: André Graffin, Kuala Lumpur (MY)

(73) Assignee: Serac Group, La Ferte Bernard (FR)

( * ) Notice: Subject to any disclaimer, the term of this patent is extended or adjusted under 35 U.S.C. 154(b) by 316 days.

(21) Appl. No.: 11/488,018

(22) Filed: Jul. 18, 2006

(65) Prior Publication Data

US 2007/0018126 A1 Jan. 25, 2007

(30) Foreign Application Priority Data

Jul. 19, 2005 (FR) .................................. 05 07645

(51) Int. Cl.
*F16K 31/12* (2006.01)

(52) U.S. Cl. .......................................... 251/25; 251/38

(58) Field of Classification Search .................. 251/25, 251/26, 38, 39, 63.5, 122
See application file for complete search history.

(56) References Cited

U.S. PATENT DOCUMENTS 3,048,194 A * 8/1962 Huthsing, Sr. et al. . 137/630.15
4,779,837 A * 10/1988 Mito et al. .................... 251/26
5,878,992 A 3/1999 Edwards et al.

FOREIGN PATENT DOCUMENTS

FR 2 791 033 A1 9/2000
FR 2 838 730 A1 10/2003
WO WO-2005/003018 A1 1/2005

* cited by examiner

*Primary Examiner*—John Rivell
*Assistant Examiner*—Marina Tietjen
(74) *Attorney, Agent, or Firm*—Muncy, Geissler, Olds & Lowe, PLLC

(57) ABSTRACT

A filler spout comprising a tubular body having a transverse partition pierced by an opening forming a valve seat which is associated with a main valve member that is connected to a piston extending in a pilot cavity connected to an exhaust orifice and to a pilot duct having a pilot orifice provided with a controlled pilot valve member, the pilot duct opening out to a face of the piston that causes the main valve member to move towards an open position when the pilot duct is fed with a liquid under pressure.

10 Claims, 2 Drawing Sheets

FILLER SPOUT WITH OPENING SERVO-CONTROLLED BY A PILOT VALVE

The present invention relates to a filler spout fed with a liquid under pressure.

BACKGROUND OF THE INVENTION

A filler spout is known, in particular from document FR-A-2 838 730, that comprises a tubular body having a main valve member mounted therein and associated with a valve seat for opening or closing the filler spout, the main valve member being connected to an electromagnetic actuator.

The electromagnetic actuator presents the advantage of controlling the main valve member without it being necessary to pass through the wall of the tubular body, such that that type of filler spout is particularly well adapted to packaging foodstuffs.

Nevertheless, because of the small amount of space available, it is not possible to provide magnetic parts that deliver a strong field. The force applied to the main valve member in order to open it is therefore limited and it is generally necessary to provide buffer vessels for the purpose of regulating pressure upstream from the filler spout. The presence of such buffer vessels constitutes a constraint in terms of the volume occupied by the buffer vessels close to the filler installation, and by the bacteriological problems that arise when a liquid foodstuff is stored in a buffer vessel.

OBJECT OF THE INVENTION

An object of the invention is to propose a filler spout including a control device for the main valve member that can operate with high feed pressures.

SUMMARY OF THE INVENTION

In order to achieve this object, the invention provides a filler spout comprising a tubular body having a transverse partition pierced by an opening forming a valve seat associated with a main valve member connected to a piston extending in a pilot cavity that is connected to an exhaust orifice and to a pilot duct having a pilot orifice provided with a controlled pilot valve member, the pilot duct opening out to a face of the piston that causes the main valve member to be moved towards an open position when the pilot duct is filled with liquid under pressure.

Thus, by providing a pilot valve of small size, it is easy to drive it by means of an electromagnetic actuator, even when the liquid for packaging is at a high pressure, and the pressure admitted into the pilot cavity exerts an actuation force on the main valve member that is a function of the surface area of the piston. Regardless of the feed pressure of the liquid, it is thus possible to cause the main valve member to open by appropriately dimensioning the piston relative to the size of the main valve member.

In an advantageous version of the invention, the main valve member is connected to the piston by a tubular connection forming the pilot duct that lies on the same axis as the main valve member. The resulting assembly is thus particularly compact.

In another advantageous aspect of the invention, the pilot valve member is connected by a pilot rod to a shutter that closes the exhaust orifice while the pilot orifice is opening. This enables the main valve member to be opened quickly.

BRIEF DESCRIPTION OF THE DRAWINGS

Other characteristics and advantages of the invention appear on reading the following description of a preferred and non-limiting embodiment of the filler spout of the invention, given with reference to the accompanying figures, in which.

DETAILED DESCRIPTION OF THE INVENTION

Figure 1:
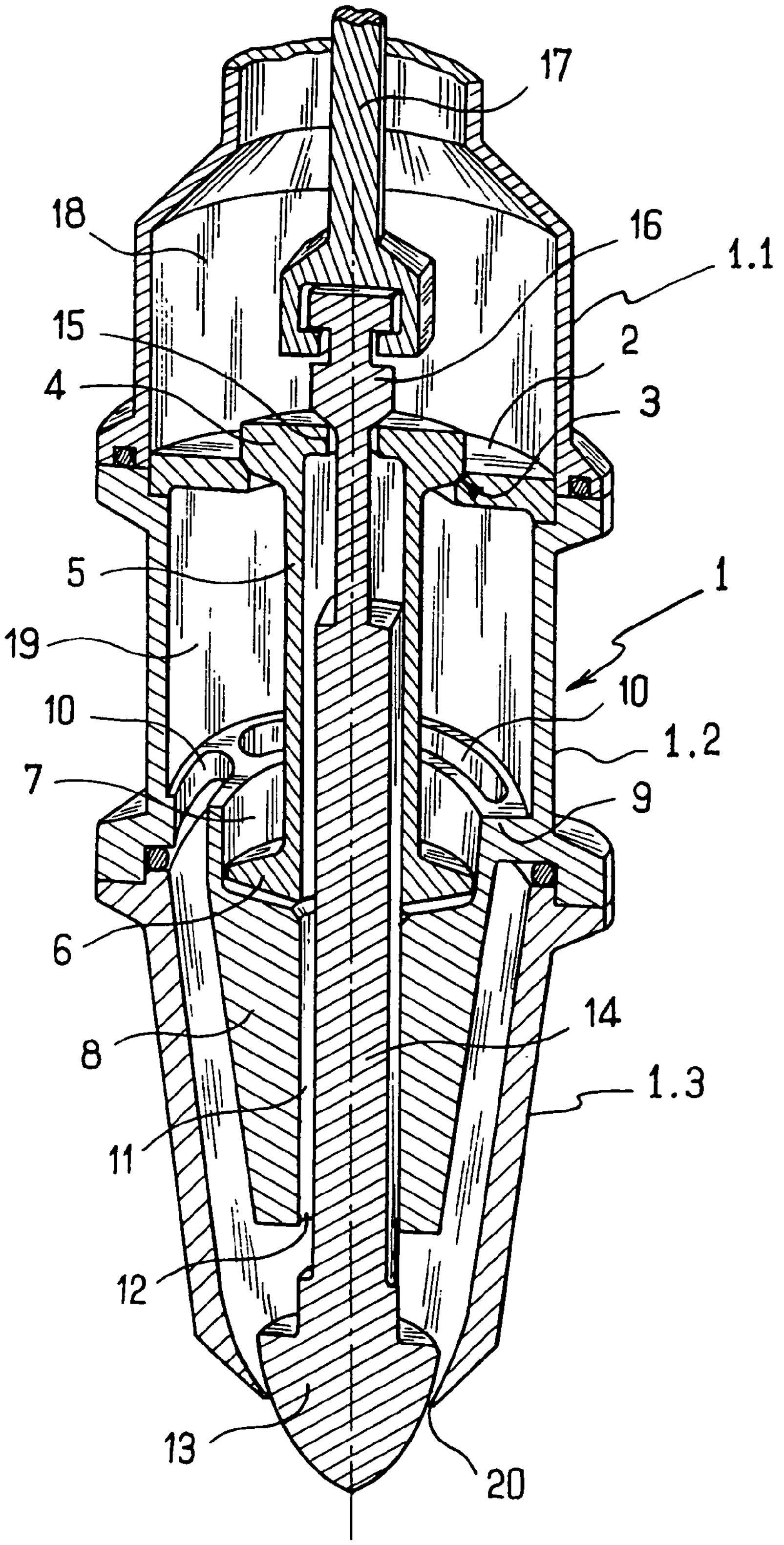
FIG. 1 is a perspective view in axial section of a filler spout of the invention in the closed position.

With reference to the drawings, the filler spout comprises in a manner that is known from the above-mentioned document, a tubular body 1 made up of three elements 1.1, 1.2, and 1.3 that are connected to one another by quick couplings that are shown. The body element 1.1 is connected to a device for feeding liquid under pressure. The body element 1.2 includes a transverse partition 2 with a central opening 3 forming a valve seat which is associated with a main valve member 4.

In the embodiment of the invention that is shown, the main valve member 4 is pierced by a pilot orifice 15 disposed coaxially relative to the main valve member 4. In addition, the main valve member 4 is connected by a tubular pilot duct 5 extending along the axis of the main valve member 4 to a piston 6 of circular section mounted to slide in a cylindrical pilot cavity 7 formed at the top end of a core 8 secured to the inside of the body element 1.2 by a collar 9 that includes oblong slots 10 so as to allow the liquid to flow around the core 8. The pilot cavity 7 opens out from the top portion of the core 8 so as to have an opening enabling the piston to move out from the pilot cavity when the main valve member 4 moves towards the open position.

Figure 3:
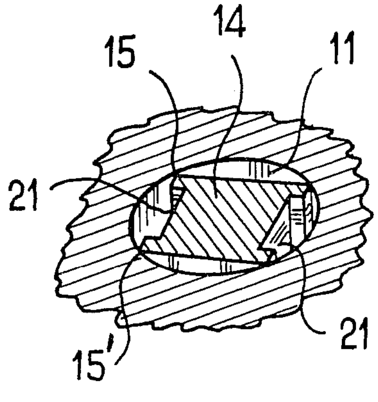
FIG. 3 is a fragmentary section view on a larger scale on line III-III of FIG. 2.

An exhaust duct 11 of circular section passes vertically through the core 8 on the axis of the tubular pilot duct 5. The top end of the exhaust duct 11 opens out into the bottom of the cavity 7, and its bottom end has an exhaust orifice 12 which is associated with a shutter 13 secured to the bottom end of a pilot rod 14 of square section (see FIG. 3) whose vertical edges 15' are guided by the inside wall of the exhaust duct 11.

The pilot rod 14 extends vertically inside the pilot duct 5 and inside the pilot orifice 15 of the main valve member 4. A pilot valve member 16 is secured to the top end of the pilot rod 14. The pilot valve member 16 is connected in separable manner to a control rod 17, itself connected to an actuator that is not shown.

In the position shown in FIG. 1, the filler spout is in its closed position, i.e. the main valve member 4 is pressed against its seat 3 and the pilot valve member 16 closes the pilot orifice 16, while the shutter 13 is spaced apart from the exhaust orifice 12. The main valve member 4 and the pilot valve member 16 thus provide leaktight separation between the feed chamber 18 defined by the body element 1.1 and the delivery chamber 19 defined by the body elements 1.2 and 1.3. The delivery chamber 19 is preferably kept full of liquid by providing a shutter 13 whose bottom surface co-operates with a constriction 20 at the bottom end of the tubular body 1 with clearance that is just sufficient for the liquid contained in the delivery chamber 19 to be retained by capillarity when the main valve member 4 and the pilot valve member 16 are in a closed position. In this position, the piston 6 extends close to the bottom of the pilot cavity 7.

Figure 2:
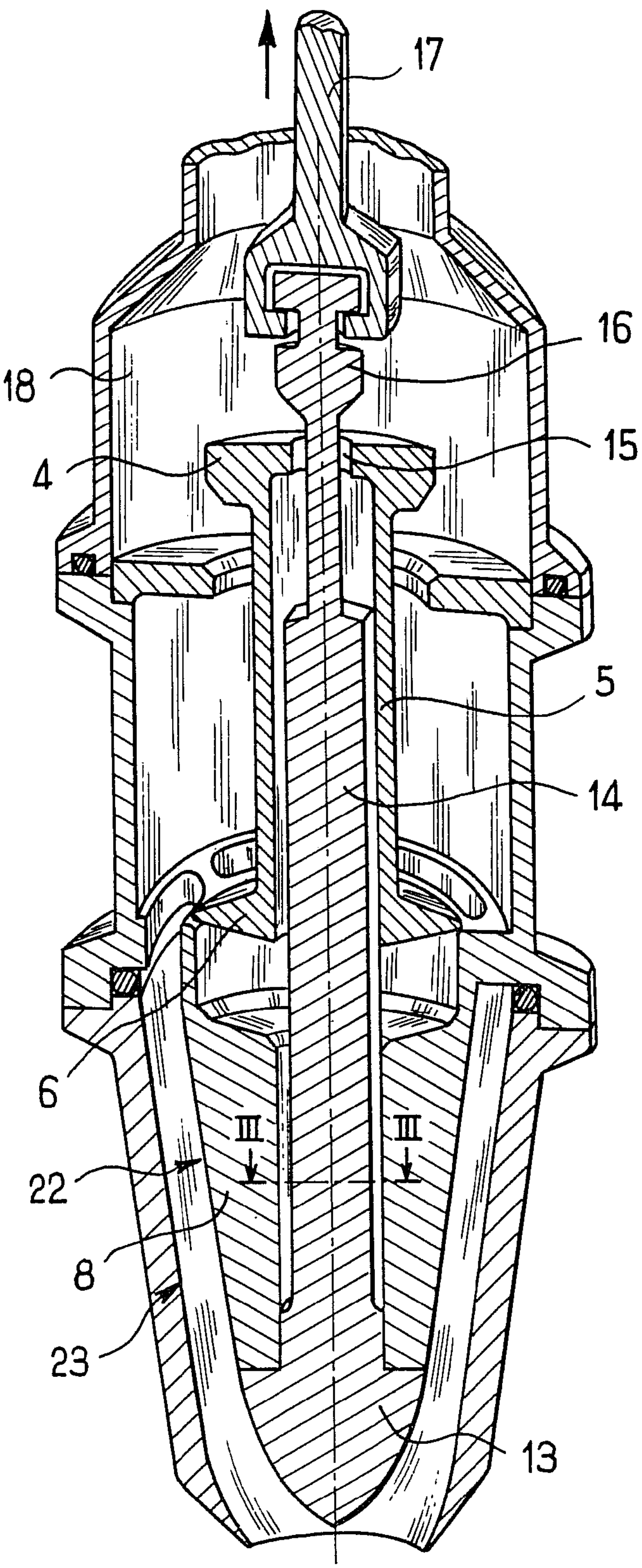
FIG. 2 is a section view analogous to that of FIG. 1 showing the filler spout in the open position.

In order to open the filler spout, as shown in FIG. 2, the control rod 17 is pulled upwards, thus simultaneously moving the pilot valve member 16 upwards, thereby opening the pilot orifice 15, and moving the shutter 13 upwards, thereby closing the exhaust orifice 12. It should be observed that because of the small size of the pilot valve member 16, it can be driven with a minimal amount of force. The liquid contained in the feed chamber 18 then flows through the pilot orifice 15 and the pilot duct 5, and after filling the exhaust duct 11, the liquid exerts pressure on the bottom face of the piston 6. Rapid filling of the pilot duct 5 and of the exhaust duct 11 is encouraged by longitudinal grooves 21 (FIG. 3) in two opposite faces of the pilot rod 14.

The piston 6 is dimensioned relative to the main valve member 4 so that the force exerted upwards by the liquid on the piston 6 in the cavity 7 is greater than the force exerted downwards on the main valve member 4 by the liquid contained in the feed chamber 18. While the pilot valve member 16 is opening, the main valve member 4 is thus moved towards its open position as shown in FIG. 2. When the piston 6 reaches the top edge of the cavity 7, the liquid held captive in the cavity 7 can escape and the main valve member 4 is thus held in an open position that is stable. This position is preferably designed so that the flow at the outlet from the filler spout is laminar. A laminar flow at the outlet from the filler spout is also encouraged by providing a core 8 whose outside surface 22 is conical with a cone shape corresponding to the inside surface 23 of the facing body element 1.3. The shutter 13 is preferably also of a shape that is adapted so that in the open position of the pilot valve member, the bottom surface of the shutter 13 extends the outside surface 22 of the core 8 without discontinuity, as shown in FIG. 2.

In order to close the filler spout, the pilot valve member 16 is actuated downwards so as to reclose the pilot orifice 15. In this movement, the exhaust orifice 12 is opened, such that the pressure acting on the bottom face of the piston 6 drops. The main valve member 4 then recloses under the effect of the weight of the moving assembly and the pressure exerted by the liquid contained in the feed chamber 18.

Naturally, the invention is not limited to the embodiment described and variant embodiments can be applied thereto without going beyond the ambit of the invention as defined by the claims.

In particular, although the invention is shown with reference to a device in which the pilot valve member and the pilot duct are on the same axis as the main valve member 4 and the tubular body 1, it is possible to provide for the pilot valve member to be off-center, being associated with a pilot duct that opens out laterally into the bottom of the cavity 7.

Similarly, it is possible to provide a shutter 13 whose sole function is to close or open the exhaust orifice without having any auxiliary valve member function that serves to keep the delivery chamber 19 full.

Although the invention is described as having a pilot rod that is square in section, it is possible, more generally, to provide for the pilot rod to be polygonal in section.

What is claimed is:

1. A filler spout comprising a tubular body having a transverse partition pierced by an opening forming a valve seat associated with a main valve member, wherein the main valve member is connected to a piston extending in a pilot cavity that is connected to an exhaust orifice and to a pilot duct having a pilot orifice provided with a controlled pilot valve member, the pilot duct opening out to a face of the piston that causes the main valve member to be moved towards an open position when the pilot duct is filled with liquid under pressure.

2. A filler spout according to claim 1, wherein the main valve member is connected to the piston by a tubular connection forming the pilot duct that lies on the same axis as the main valve member.

3. A filler spout according to claim 2, wherein the exhaust orifice lies on the axis of the pilot duct, and wherein the pilot valve member is connected by a pilot rod to a shutter that closes the exhaust orifice while the pilot orifice is opening.

4. A filler spout according to claim 3, wherein the pilot cavity is made in a core which is secured to the tubular body and which has an exhaust duct passing therethrough providing a connection between the pilot cavity and the exhaust orifice.

5. A filler spout according to claim 4, wherein the exhaust duct is circular in section and the pilot rod is polygonal in section.

6. A filler spout according to claim 5, wherein the pilot rod has at least one longitudinal groove in a face of the pilot rod.

7. A filler spout according to claim 3, wherein the shutter has a bottom surface co-operating with a constriction of the tubular body so as to retain a liquid contained in the tubular body by capillarity when the main valve member is in a closed position.

8. A filler spout according to claim 4, wherein the core has a conical outside surface with a conical shape corresponding to a facing inside surface of the tubular body.

9. A filler spout according to claim 8, wherein the shutter has a bottom surface co-operating with a constriction of the tubular body so as to retain a liquid contained in the tubular body by capillarity when the main valve member is in a closed position, and wherein, for an open position of the pilot valve member, the bottom surface of the shutter extends the outside surface of the core without discontinuity.

10. A filler spout according to claim 1, wherein the cavity includes an opening enabling the piston to move out from the cavity during the displacement of the main valve member towards the open position.

* * * * *